United States Patent Office 2,856,754
Patented Oct. 21, 1958

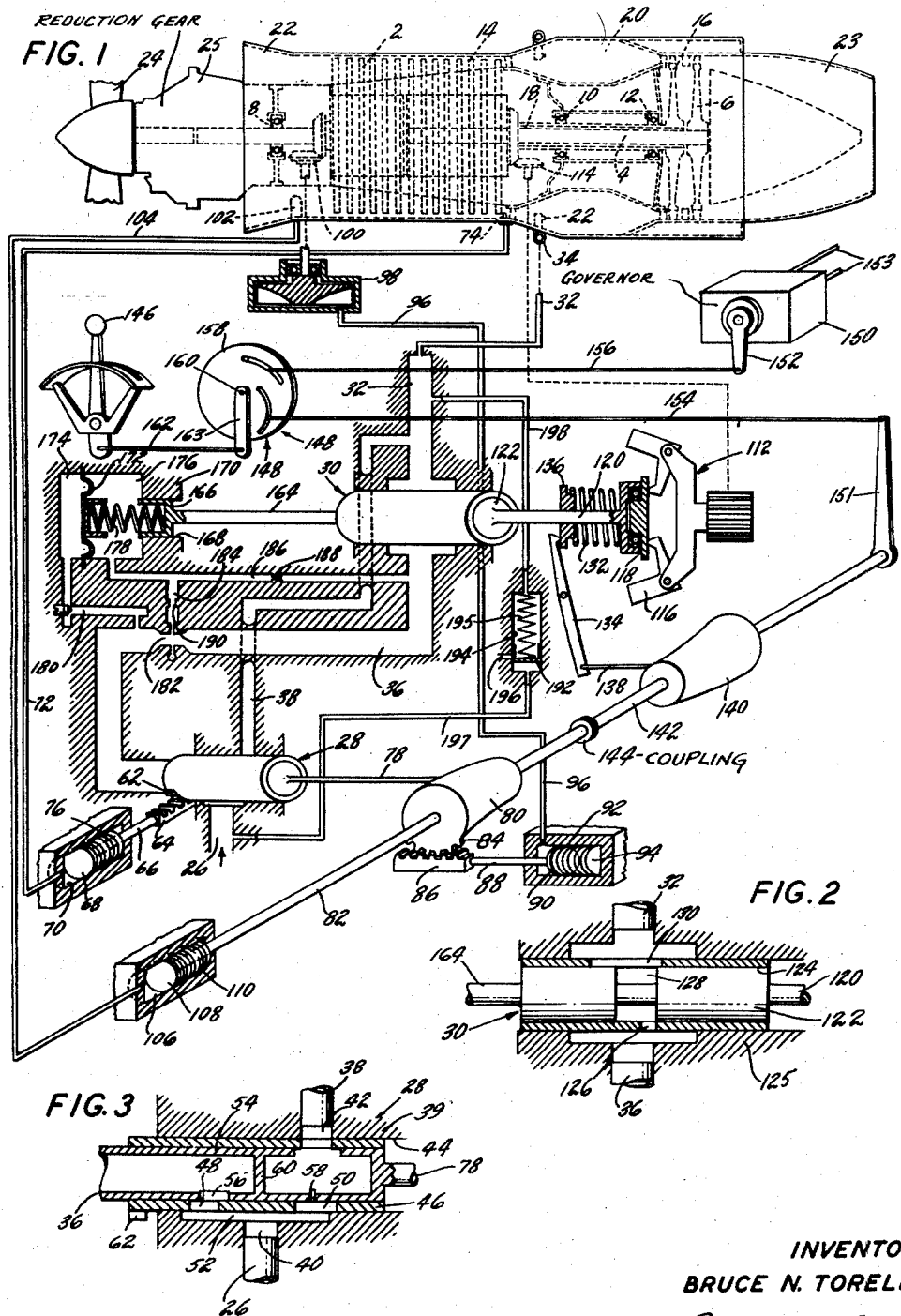

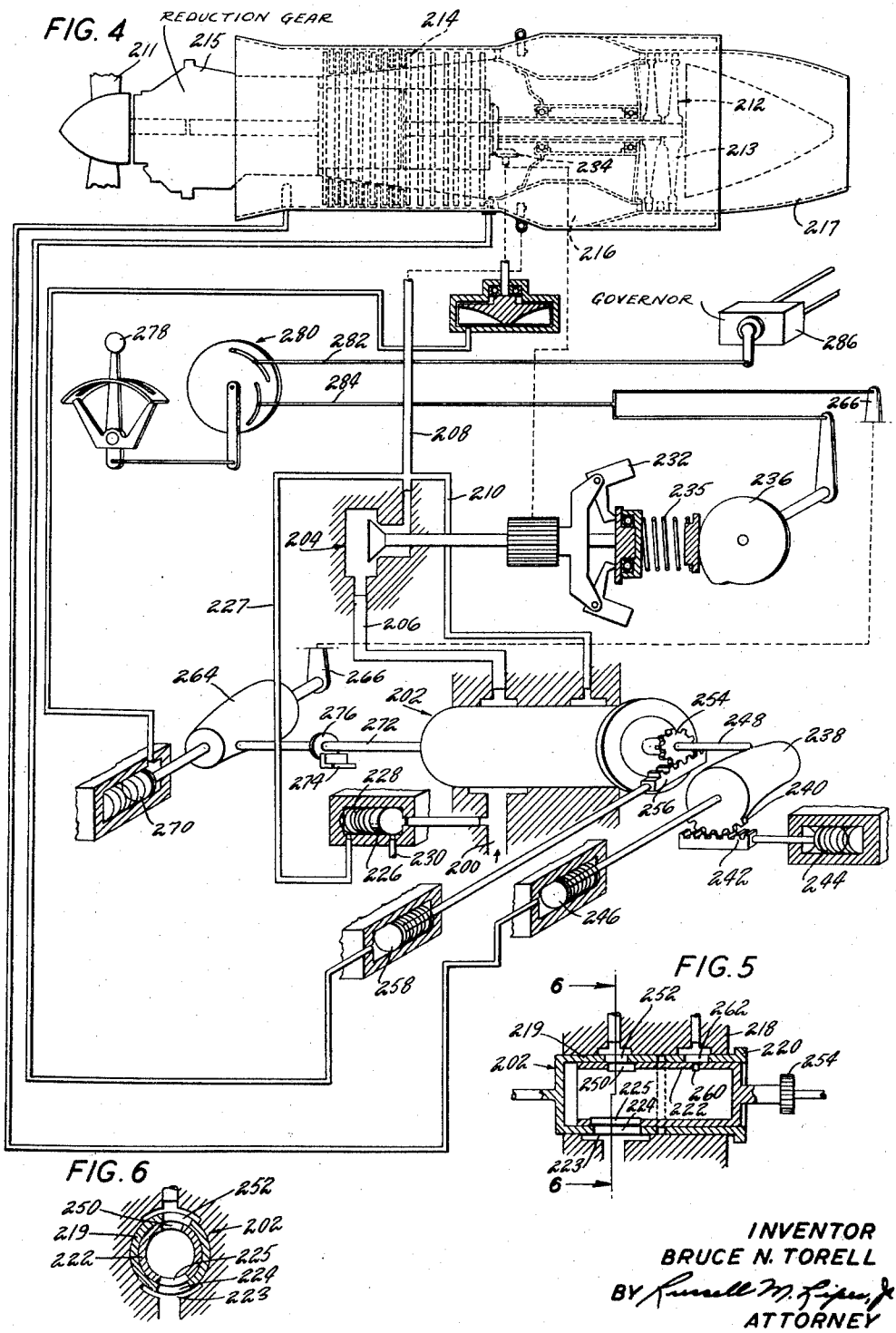

2,856,754

FUEL CONTROL INCLUDING MINIMUM FUEL FLOW LIMITING FOR A SPLIT-TURBINE TYPE POWER PLANT

Bruce N. Torell, Wethersfield, Conn., assignor to United Aircraft Corporation, East Hartford, Conn., a corporation of Delaware Continuation of application Serial No. 297,312, July 5, 1952. This application November 1, 1956, Serial No. 619,833

23 Claims. (Cl. 60—39.28)

This application is a continuation of my co-pending application Serial No. 297,312 filed July 5, 1952, for Fuel Control System, and now abandoned.

This invention relates to fuel controls for gas turbine power plants and particularly to a control for use with a turbo-prop engine.

One feature of the invention is an arrangement of three metering elements two of which are in series with the third in parallel with the first two. The pressure drop across this arrangement is maintained constant by a conventional pressure regulating valve. The third metering element is utilized for establishing a minimum flow during deceleration and altitude idling operation. One of the valves in series, the regulator valve, determines maximum flow and is responsive to engine speed, the temperature at a selected point in the compressor and also the pressure at a selected point in the compressor. For this purpose the valve may be movable in each of two directions with cooperating rectangular ports the effective flow area of which is varied by the valve movement. Also with this arrangement the other valve in series, the governor valve, is movable in response to engine speed and is adjusted by the power lever to establish the selected engine speed.

Another feature of the invention is the modification of the engine speed response of the governor valve as a function of fuel flow thereby biasing the governor in response to changes in fuel flow.

One feature of this control is its applicability to split turbine power plants where there are independently rotating low and high pressure rotors. With this arrangement the speed of one rotor may determine the movement of the governor valve and the speed of the other rotor may control the regulator valve. One particular feature is the control of the governor valve from the rotor that is not attached to the propeller, that is, the rotor that has no external load to control its speed.

With the three metering elements as above described, one feature of the invention is the arrangement of the regulator valve so that in addition to its being responsive to a direct function of speed, and also responsive to a compressor pressure and a compressor temperature, it will also be responsive to throttle position and an inverse function of speed. With this arrangement the governor valve will function when the propeller is in fixed pitch and at other times will be open and the fuel flow will be solely under the control of the regulator valve.

Other objects and advantages will be apparent from the specification and claims, and from the accompanying drawings which illustrate an embodiment of the invention.

Fig. 1 is a diagrammatic view of the fuel control.

Fig. 2 is a longitudinal sectional view through the governor valve of Fig. 1.

Fig. 3 is a longitudinal sectional view through the regulator valve of Fig. 1.

Fig. 4 is a diagrammatic view of a modification of the control.

Fig. 5 is a longitudinal sectional view through the regulator valve of Fig. 4.

Fig. 6 is a transverse sectional view through the regulator valve along line 6—6 of Fig. 5.

The control is intended for use in connection with gas turbine power plants and is shown in particular with a gas turbine power plant of the type having separately rotatable multistage low pressure and high pressure compressors connected to and driven by separately rotating high pressure and low pressure turbine stages, respectively. As shown in the drawing, the low pressure compressor 2 is connected by a shaft 4 to the low pressure turbine 6 to form a spool, the shaft being supported by bearings 8, 10 and 12. This spool, referred to as the inner spool, rotates independently of an outer spool which consists of the high pressure compressor 14, the high pressure turbine 16 and the interconnecting sleeve 18 which surrounds the shaft 4. Each of the compressors is shown as a multistage axial-flow compressor with the low pressure compressor discharging into the high pressure compressor inlet and with the high pressure discharge connected to the inlet end of a combustor 20 in which fuel supplied through nozzles 22 is mixed with the air and burned before being discharged into the turbines which are located in series at the downstream end of the combustor. The gas having passed through both of the turbines is discharged through a thrust nozzle 23. The low pressure turbine 6 also drives a propeller 24 connected through a reduction gear 25 to the shaft 4.

The fuel control includes a supply conduit 26 leading to a regulating valve 28 and thence to a governor valve 30. From the governor valve 30 fuel is delivered through a conduit 32 to the manifold 34 through which fuel reaches the nozzles. A conduit 36 provides a connection between the valves 28 and 30 and a substantially parallel conduit 38 by-passes the valve 30 to provide communication from the valve 28 to the conduit 32 downstream of the governor valve. The conduits 26, 36, 38 and 32 together form a supply conduit for the power plant with the valves 28 and 30 located in that supply conduit for controlling the quantity of fuel delivered to the power plant.

The regulator valve 28 performs two functions. It meters the flow of fuel from the conduit 26 into the conduit 36, and it also meters fuel into the conduit 38, the latter, as will later appear, functioning as a minimum flow passage. The regulator valve 28, Fig. 3, is in the form of a casing 39 having a port 40 connected with the supply conduit 26 and a delivery port 42 connected to the conduit 38. The casing has a bore 44 which receives a liner 46 having axially spaced rectangular ports 48 and 50 therein both of which are in communication with a groove 52 in the inner wall of the casing.

Within the liner 46 is a sleeve valve 54 which has a rectangular port 56 communicating with the port 48 and a narrow circumferentially extending port 58 cooperating with the port 50. The sleeve valve is provided with a partition 60 to prevent fuel flow within the sleeve between the two ports therein so that fuel flow through the cooperating ports 48 and 56 is directed out the end of the sleeve valve and into the conduit 36 communicating therewith.

For varying the flow through the cooperating ports 48 and 56 the liner 46 is arranged to be turned angularly as a function of the compressor discharge pressure. This may be accomplished by a row of gear teeth 62 on the end of the liner cooperating with a rack 64 on a rod 66 extending from a piston 68 in a cylinder 70. A conduit 72 from a pressure tap 74 at the discharge end of the high pressure compressor transfers the fluid pressure at that point to one end of the cylinder 70 tending to move the piston 68. This motion is resisted by a coil spring 76 so that the position of the piston 68 is a function of the compressor discharge pressure.

The effective area of the cooperating ports 48 and 56 may also be varied by longitudinal movement of the sleeve valve 54. To this end the valve has a projecting stem 78 which engages with a three-dimensional cam 80 on a shaft 82. The cam is rotatable as a function of speed by means of gear teeth 84 on the cam engageable with a rack 86 on a rod 88 projecting from a piston 90 in a cylinder 92. The piston 90 is urged in one direction by a spring 94 and is moved in the other direction by a fluid pressure delivered through a conduit 96, this pressure varying as a function of the speed of the inner spool of the power plant.

One means for obtaining this pressure may be a centrifugal pump 98 driven as through gearing 100 from the inner spool. The discharge side of this pump connects with the conduit 96 thereby delivering to the cylinder 92 a pressure varying as a function of the speed of the inner, or low pressure, spool. A speed sensing means of this type is well known and need not be described in greater detail.

This same cam 80 is shifted axially as a function of compressor inlet temperature. To this end a temperature sensing device 102 located in the inlet to the low pressure compressor is connected by a conduit 104 to a cylinder 106 in which is located a piston 108. The piston is acted on by a spring 110 and is connected to the shaft 82. Thus, as the temperature increases in the compressor inlet, the piston 108 is moved against the resistance of the spring 110 to shift the cam toward the right.

Since the ports 48 and 56 are rectangular and overlapping, the effective area of these ports is varied as a direct function of the compressor pressure converted to rotation of the liner 46 and a function of the speed and temperature converted to longitudinal movement of the sleeve by means of the cam 80. During accelerations when the governor valve is open the full pressure drop of the pressure regulating valve is taken across these ports and hence the fuel delivered through these ports is, therefore, varied as the product of the compressor discharge pressure function and the compressor inlet temperature and speed function.

The minimum flow passage of valve 28 is formed by the cooperating ports 50 and 58. The axial dimension of the port 50 is such that axial movement of the sleeve has no effect on the open area of port 58 although rotary motion of the liner 46 will vary the effective area. Thus, since the pressure drop is held constant by a pressure regulating valve hereafter described, the flow through the port 58 is a direct function of the pressure of the compressor pressure at all times.

The governor valve 30 is adjustable as a function of the speed of the outer or high-pressure spool through the flyweight governor 112. This governor may be driven as through bevel gears 114 from the outer, or high pressure, spool, as will be apparent. The flyweights 116 engage with a disc 118 on the end of a rod 120 on the plunger 122, Fig. 2, slidable in a sleeve 124 in the casing 125 forming part of the governor valve. The sleeve 124 has an inlet port 126 communicating with the conduit 36 which port is more or less uncovered by a groove 128 in the plunger 122. For more accurate metering of the flow through the governor valve it may be advantageous to have the port 126 rectangular.

The sleeve 124 has a discharge port 130 communicating with the conduit 32, the port 130 being large enough so that no metering will take place at this point. As the flyweights move outward under increasing speed of the outer spool, the action of the flyweights is to move the plunger 122 to the left, thereby reducing the effective area of the port 126. Alternatively as the outer spool slows down the flyweights 116 exert less pressure and the plunger 122 is moved to the right under the action of a governor spring 132 surrounding the stem 120.

To control the power plant speed the tension of the spring 132 may be adjustable by the pilot through the medium of a lever 134 one end of which engages a ring 136 on the end of the spring and the other end of which carries a rod 138 engageable with a cam 140. This cam has a supporting shaft 142 which is connected by a coupling 144 to the shaft 82 so that the cams 80 and 140 move axially in unison. Thus, cam 140 is moved axially as a function of compressor inlet temperature to the same extent that the cam 80 is shifted. The coupling 144 permits relative rotation between the shafts 82 and 142 and also the cams 80 and 140. The angular position of the cam 140 may therefore be adjusted independently of cam 80 and arranged to be turned as a function of the position of the pilot's control lever 146.

In the arrangement shown the pilot's control lever operates through a control coordinator 148 to move the shaft 142 through the appropriate angle by means of a lever arm 151 on the shaft 142, and also to set the propeller governor 150 through movement of a lever arm 152 on the propeller governor. The governor is suitably connected as by conduits 153 to control the propeller pitch control mechanism of conventional construction. The coordinator may be of any suitable type to provide the necessary movement of the rod 154 connected to the lever arm 151 and the rod 156 connected by the lever arm 152. For the purpose of the present invention the coordinator may consist of a cam 158 pivoted on a shaft 160 and having cam grooves therein with which the ends of rod 154 and 156 engage. The cams are turned from the pilot's power lever through a rod 162 from the power lever, the rod engaging with an arm 163 on shaft 160. Thus, a motion of a pilot's control lever will produce a proportional movement of the lever arm 152 for the propeller governor and the arm 151 for the governor valve cam 140. With this arrangement, the effectiveness of the speed governor 112 is adjusted as a function of the position of the pilot's control lever 146 and also as a function of the compressor inlet temperature as will be apparent.

The governor valve is also shifted as a function of the fuel flow between the valves 28 and 30. To this end the plunger 122 has a projecting stem 164 having, on its outer end, a plunger 166 slidable in a bore 168 in a casing 170. The casing has a diaphragm 172 therein defining on opposite sides thereof chambers 174 and 176. The diaphragm also is engaged by a spring 178 the other end of which acts on the plunger 166.

The pressure existing in the chambers 174 and 176 is varied as a function of the fuel flow in conduit 36. The chamber 174 is connected by a passage 180 to the inlet end of a venturi 182 in the conduit 36. The chamber 176 is connected by a passage 184 to the throat of the venturi. Thus, as the flow through conduit 36 increases the pressure difference between the two chambers will also increase tending to move the diaphragm 172 to the right, thereby resisting the action of the flyweights 116 in moving the valve in a direction to reduce the fuel flow. The passage 184 may have a by-pass conduit 186 to a point in the conduit 36 downstream of the venturi with an orifice 188 therein. With this arrangement the passage 184 would also have an orifice 190 therein.

The pressure drop across the metering elements is maintained constant. To this end a valve in the form of a plunger 192 in a cylinder 194 is acted on by a spring 195 to cover more or less an outlet port 196 in the wall of the cylinder. The opposite ends of the cylinder are connected by ducts 197 and 198 to the inlet conduit 26 and delivery conduit 32 respectively. Thus as the pressure drop across the metering elements tends to increase, the plunger 192 is moved to uncover the port 196 to reduce the inlet pressure in conduit 26.

The above described arrangement is intended primarily for a split turbine type of power plant where there are two independently rotating spools. The same basic arrangement of three metering elements two of which are in series, and with the third element in parallel with the first two may be applied to a power plant having a single rotor and with a somewhat different arrangement of the controls.

With reference now to the arrangement shown in Fig. 4, the scheme consists basically of the same three metering elements corresponding to the two parts of the regulator valve 28 of Fig. 1 and the governor valve 30. In this arrangement fuel, from a supply conduit 200 reaches the regulator valve 202 and thence to a governor valve 204 by way of a conduit 206. From the governor valve 204 a delivery conduit 208 conveys the fuel to the power plant. The minimum flow which is also controlled by the regulator valve 202 is directed by a conduit 210 to the delivery conduit 208 downstream of the governor valve.

The power plant in the arrangement shown includes a propeller 211 driven from a turbine 212 the rotor 213 of which also drives the compressor rotor 214. A reduction gear 215 is provided for the propeller. Fuel mixed with air compressed by the compressor is burned in a combustor 216 and is discharged through the turbine to a thrust nozzle 217.

The regulator valve 202, as shown in detail in Figs. 5 and 6, includes a casing 218 having a sleeve 219 therein. In alignment with the end of the sleeve 219, which is rotatable and axially movable, as will hereinafter appear, is a fixed sleeve 220. Fitting within both sleeves 219 and 220 is a hollow piston valve 222 which is movable both rotatably and linearly as will be pointed out. Fuel is admitted through an inlet port 223 in the casing into the hollow piston valve 222 through cooperating large diameter ports 224 and 225 in the sleeve 219 and the valve 222.

A constant pressure drop is maintained across the valve assemblies by means of a pressure control valve 226. Pressure from the delivery conduit 208 is transmitted to one end of the valve by a duct 227 and the other end of the valve is subjected to the pressure in the conduit 200. A spring 228 controls the pressure drop and enough fuel is bled into the return conduit 230 to maintain the desired pressure drop.

The governor valve 204 is actuated by a governor including flyweights 232 driven from the power plant rotor as through bevel gearing 234. The flyweights move against the tension of a spring 235 and this spring may be adjusted through a cam 236 the position of which is a function of the position of the pilot's control lever.

As above stated, the hollow piston valve 222 is moved axially through a three-dimensional cam 238 which is moved as a function of engine speed and compressor inlet temperature. As shown, the cam 238 is rotated through a gear 240 on the cam in mesh with a rack 242. The rack is connected to a piston 244 and cylinder arrangement which is adapted to sense the turbine speed by an arrangement comparable to the pump 98 of Fig. 1. The cam 238 is moved axially through the medium of a piston and cylinder arrangement 246 which is sensitive to compressor inlet temperature as is the piston 108 and cylinder 106 of Fig. 1. The cam 238 moves the hollow piston 222 through the medium of a projecting rod 248 on the valve.

For the purpose of metering the fuel flow the hollow piston valve 222 has a rectangular port 250 cooperating with a similar port 252 in the sleeve 219. Thus, the axial movement of the hollow piston will vary the flow directly as a function of engine speed and compressor inlet temperature.

The hollow piston valve 222 is rotated through a gear 254 and rack 256 the latter being connected to a piston and cylinder arrangement 258 comparable to the compressor discharge pressure sensing piston 68 and cylinder 70 of Fig. 1. This piston and cylinder sense the compressor discharge pressure and the rotation of the hollow piston valve is therefore proportional to compressor discharge pressure variations. Since the ports 250 and 252 are rectangular, it will be apparent that the effective area of the cooperating ports is proportional to the product of a function of engine speed and compressor inlet temperature and a function of compressor discharge pressure.

It will be apparent that during acceleration the cooperating ports 250 and 252 provide an effective area sufficiently large to present practically no restriction to the flow, whereas, during decelerations, the valve closes completely so that no flow occurs through these ports. In parallel with the ports 250 and 252 is a metering element between the hollow piston valve 222 and the fixed sleeve 220. The piston valve 222 has a relatively narrow port 260 which cooperates with a port 262 in the fixed sleeve, the latter port having a selected circumferential dimension such that the flow area through these cooperating ports will be a function only of the angular position of the piston valve 222. The angular position of the piston is, as above pointed out, dependent upon compressor discharge pressure so that the flow through the port 260 is a direct function of the compressor discharge pressure.

It will be apparent that the flow when the propeller is at fixed pitch setting will be controlled by the governor valve 204. Where engine speed is established through the setting of a propeller governor, however, the flyweight operated valve 204 is moved to the full open position and the flow to the engine is the sum of the flow through the ports 250 and 252 and the cooperating ports 260 and 262. In this operational range the sleeve 219 is translated by a three-dimensional cam 264 as a function of throttle position and engine speed. To accomplish this the cam 264 is turned angularly through the medium of a lever arm 266 connected to the power lever such that the rotation of the cam is proportional to the movement of the lever. The axial movement of the cam 264 is determined by the pressure variations in a cylinder and piston arrangement 270 which is connected to a speed indicating device comparable to the pump 98. With the cam moved as a function of the power lever position and the engine speed it will be apparent that the flow area through the cooperating ports 250 and 252 is proportional to these two variations. Valve 219 has a stem 272 engaging cam 264 as will be apparent.

During accelerations of the power plant the sleeve 219 is moved into a full-open position so that the flow of fuel to the power plant is under the control of the governor valve 204. At this time a fixed stop 274 engages with a collar 276 on the stem 272 to determine the maximum flow. The governor valve 204 is operative when the propeller on the power plant is at a fixed pitch setting and the flow through the valve is dependent on the tension of the spring as will be apparent.

In the region of engine operation where engine speed is established through the setting of a propeller governor the flyweight operated valve 204 is moved to the full open position and the flow which reaches the engine is then controlled entirely by the regulator valve 202.

In Fig. 4 the power lever 278 acts through a coordinator 280 similar to coordinator 148 to move the two rods 282 and 284 which are connected to the propeller governor 286 and to the cam 236 and lever arm 266 respectively.

Although the arrangement of Fig. 4 has been described as applicable to a single rotor power plant, it will be understood that the control may be adapted to a split turbine type, with the speed of one rotor sensed by the device 244 and the speed of the other rotor sensed by the governor 232.

It is to be understood that the invention is not limited to the specific embodiment herein illustrated and described, but may be used in other ways without departure from its spirit as defined by the following claims.

I claim:

1. A fuel control for a gas turbine engine having a compressor, a turbine driving the compressor and a combustor, said control including a source of fuel under pressure, a nozzle for discharging fuel into the combustor and a conduit connecting said source to said nozzle, two metering valves in series in said conduit, one of said valves being movable in response to a compressor pressure, and a third metering valve in parallel with said first two valves, said third metering valve being responsive to a compressor pressure for varying the flow through the nozzles as a function of pressure variations in the compressor.

2. A fuel control for a gas turbine engine having a compressor, a turbine driving the compressor and a combustor, said control including a source of fuel under pressure, a nozzle for discharging fuel into the combustor and a conduit connecting said source to said nozzle, two metering valves in series in said conduit, one of said valves being movable in response to a compressor pressure and a compressor temperature, and the other valve being responsive to engine speed and a third metering valve in parallel with said first two valves, said third metering valve being responsive to a compressor pressure.

3. A fuel control for a gas turbine engine having a compressor, a turbine driving the compressor and a combustor, said control including a source of fuel under pressure, a nozzle for discharging fuel into the combustor and a conduit connecting said source to said nozzle, two metering valves in series in said conduit, one of said valves being movable in response to compressor discharge pressure and compressor inlet temperature, and the other valve downstream of said one valve being responsive to engine speed, and a third metering valve in parallel with said first two valves and responsive to a compressor pressure.

4. A fuel control for a gas turbine engine having a compressor, a turbine driving the compressor and a combustor, said control including a source of fuel under pressure, a nozzle for discharging fuel into the combustor and a conduit connecting said source to said nozzle, two metering valves in series in said conduit, one of said valves being movable in response to variations in temperature and pressure at selected points in the compressor, and the other valve being movable in response to engine speed, a third valve in parallel with said first two valves and movable in response to variations in pressure at a selected point in the compressor and means for regulating the pressure drop across said valves.

5. A fuel control for a gas turbine engine having a compressor, a turbine driving the compressor and a combustor, said control including a source of fuel under pressure, a nozzle for discharging fuel into the combustor and a conduit connecting said source to said nozzle, two metering valves in series in said conduit, one of said valves being movable in response to compressor inlet temperature, compressor discharge pressure and engine speed, and the other valve downstream of said one valve being movable in response to engine speed and a third valve in parallel with said first two valves and responsive to variations in the pressure at a selected point in the compressor.

6. A fuel control for a gas turbine engine having a compressor, a turbine driving the compressor and a combustor, said control including a source of fuel under pressure, a nozzle for discharging fuel into the combustor and a conduit connecting said source to said nozzle, two metering valves in series in said conduit, one of said valves being movable in response to compressor pressure and compressor temperature, a governor driven by the engine and means for shifting the other of said two valves by said governor as a function of engine speed, and a third metering valve in parallel with said first two valves and movable in response to at least one condition of engine operation.

7. A fuel control for a gas turbine engine having a compressor, a turbine driving the compressor and a combustor, said control including a source of fuel under pressure, a nozzle for discharging fuel into the combustor and a conduit connecting said source to said nozzle, two metering valves in series in said conduit, one of said valves being movable in response to compressor pressure and compressor temperature, a governor driven by the engine and means for shifting the other of said two valves by said governor as a function of engine speed, a third metering valve in parallel with said first two valves, and means for adjusting said third metering valve as a function of pressure variations in the compressor.

8. A fuel control for a gas turbine engine having a compressor, a turbine driving the compressor and a combustor, said control including a source of fuel under pressure, a nozzle for discharging fuel into the combustor and a conduit connecting said source to said nozzle, two metering valves in series in said conduit, one of said valves being movable in response to compressor pressure and compressor temperature, a governor driven by the engine and means for shifting the other of said two valves by said governor as a function of engine speed, and a third metering valve in parallel with said first two valves, a spring acting on said governor, and means for varying the effect of the spring as a function of compressor temperature.

9. A fuel control for a gas turbine engine having a compressor, a turbine driving the compressor and a combustor, said control including a source of fuel under pressure, a nozzle for discharging fuel into the combustor and a conduit connecting said source to said nozzle, two metering valves in series in said conduit, one of said valves being movable in response to compressor pressure and compressor temperature, a governor driven by the engine and means for shifting the other of said two valves by said governor as a function of engine speed, a third metering valve in parallel with said first two valves, and means responsive to fuel flow between said first two valves for resisting the action of the governor on said other valve.

10. A fuel control for a gas turbine engine having a low pressure compressor and a high pressure compressor, a low pressure turbine and a high pressure turbine, and a combustor, said parts being so arranged that the air flow is from the low pressure compressor to the high pressure compressor through the combustor and thence through the high and low pressure turbines, respectively, the high pressure compressor and turbine rotating as a unit, said control including a source of fuel under pressure, a nozzle for discharging fuel into the combustor and a conduit connecting said source to said nozzle, two metering valves in series in said conduit, one of said valves being movable in response to variations in the speed of one of the compressors and the other of said valves being movable in response to the speed of the other of the compressors.

11. A fuel control for a gas turbine engine having a low pressure compressor and a high pressure compressor, a low pressure turbine and a high pressure turbine, and a combustor, said parts being so arranged that the air flow is from the low pressure compressor to the high pressure compressor through the combustor and thence through the high and low pressure turbines, respectively, the high pressure compressor and turbine rotating as a unit, said control including a source of fuel under pressure, a nozzle for discharging fuel into the combustor and a conduit connecting said source to said nozzle, two metering valves in series in said conduit, one of said valves being movable in response to pressure changes at a point in the flow of air through the compressors and also movable in response to variations in the speed of one of the compressors, and the other of said valves being movable in response to the speed of the other compressor.

12. A fuel control for a gas turbine engine having a low pressure compressor and a high pressure compressor, a low pressure turbine and a high pressure turbine, and a combustor, said parts being so arranged that the air flow is from the low pressure compressor to the high pressure compressor through the combustor and thence through the high and low pressure turbines, respectively, the high pressure compressor and turbine rotating as a unit, said control including a source of fuel under pressure, a nozzle for discharging fuel into the combustor and a conduit connecting said source to said nozzle, two metering valves in series in said conduit, one of said valves being movable in response to pressure changes at a point in the flow of air through the compressors and also movable in response to variations in the speed of one of the compressors, the other of said valves being movable in response to the speed of the other compressor, and a third valve in parallel with said two metering valves, said third valve being responsive to variations in pressure at a point in the path of the flow of air through said compressors.

13. For a turbo-prop engine having a propeller, a propeller governor and a compressor, fuel control apparatus including a source of fuel under pressure and conduit means through which fuel is delivered to said engine, a regulator valve and a governor valve in series in said conduit, means including a variable datum for controlling the area of said governor valve inversely as a function of engine speed, power lever means for the coordinate controlling of said propeller governor, the datum of said governor valve controlling means and the area of said regulator valve, and means for the further controlling of the area of said regulator valve as a function of engine speed, an engine temperature and an engine pressure.

14. For a turbo-prop engine having a propeller, a propeller governor and a compressor, fuel control apparatus including a source of fuel under pressure and conduit means through which fuel is delivered to said engine, a regulator valve and a governor valve in series in said conduit, means including a variable datum for controlling the area of said governor valve inversely as a function of engine speed, power lever means for the coordinate controlling of said propeller governor, the datum of said governor valve controlling means and the area of said regulator valve, means for the further controlling of the area of said regulator valve as a function of engine speed, an engine temperature and an engine pressure, and means associated with said regulator valve for controlling minimum flow to said engine as a function of an engine pressure.

15. For a turbo-prop engine having a propeller, a propeller governor and a compressor, fuel control apparatus including a source of fuel under pressure and conduit means through which fuel is delivered to said engine, a regulator valve and a governor valve in series in said conduit, means including a variable datum for controlling the area of said governor valve inversely as a function of engine speed, power lever means for the coordinate controlling of said propeller governor, the datum of said governor valve controlling means and the area of said regulator valve, means for the further controlling of the area of said regulator valve as a function of engine speed, an engine temperature and an engine pressure, means associated with said regulator valve for controlling minimum flow to said engine as a function of an engine pressure, and means for regulating the fuel pressure drop across said regulator and governor valves.

16. For a turbo-prop engine having a propeller, a propeller governor and a compressor, fuel control apparatus including a source of fuel under pressure and conduit means through which fuel is delivered to said engine, a regulator valve and a governor valve in series in said conduit, means including a variable datum for controlling the area of said governor valve inversely as a function of engine speed, power lever means for the coordinate controlling of said propeller governor, the datum of said governor valve controlling means and the area of said regulator valve, means for biasing the controlling effect of said power lever means upon the area of said regulator valve as a function of engine speed, and means for the further controlling of the area of said regulator valve as a function of engine speed, an engine temperature and an engine pressure.

17. For a turbo-prop engine having a propeller, a propeller governor and a compressor, fuel control apparatus including a source of fuel under pressure and conduit means through which fuel is delivered to said engine, a regulator valve and a governor valve in series in said conduit, means including a variable datum for controlling the area of said governor valve inversely as a function of engine speed, power lever means for the coordinate controlling of said propeller governor, the datum of said governor valve controlling means and the area of said regulator valve, and means for the further controlling of the area of said regulator valve as a function of engine speed, compressor inlet temperature and compressor discharge pressure.

18. For a turbo-prop engine having a propeller, a propeller governor and a compressor, fuel control apparatus including a source of fuel under pressure, conduit means through which fuel is delivered to said engine and fuel metering means in said conduit, first means for controlling the area of said fuel metering means inversely as a function of engine speed, a power lever for the coordinate adjustment of said propeller governor and said first means, second means for controlling the area of said fuel metering means as a function of engine speed and the position of said power lever, and third means for controlling the area of said fuel metering means as a function of engine speed, an engine temperature and an engine pressure.

19. For a turbo-prop engine having a propeller, a propeller governor and a compressor, fuel control apparatus including a source of fuel under pressure, conduit means through which fuel is delivered to said engine and fuel metering means in said conduit, first means for controlling the area of said fuel metering means inversely as a function of engine speed, a power lever for the coordinate adjustment of said propeller governor and said first means, second means for controlling the area of said fuel metering means as a function of engine speed and the position of said power lever, and third means for controlling the area of said fuel metering means as a function of engine speed, an engine temperature and an engine pressure, and means for regulating the pressure drop across said fuel metering means.

20. For a turbo-prop engine having a propeller, a propeller governor and a compressor, fuel control apparatus including a source of fuel under pressure, conduit means through which fuel is delivered to said engine and fuel metering means in said conduit, first means for controlling the area of said fuel metering means inversely as a function of engine speed, a power lever for the coordinate adjustment of said propeller governor and said first means, means for varying the adjustment of said first means through a portion of the travel of said power lever and for maintaining a predetermined adjustment through a different portion of the travel of said power lever, second means for controlling the area of said fuel metering means as a function of engine speed and the position of said power lever, and third means for controlling the area of said fuel metering means as a function of engine speed, an engine temperature and an engine pressure.

21. For a turbo-prop engine having a propeller, a propeller governor, a compressor and a power lever, fuel control apparatus including a source of fuel under pressure, conduit means through which fuel is delivered to said engine and fuel metering means in said conduit, first means including a variable datum for controlling the area of said fuel metering means inversely as a function of engine speed, second means for controlling the area of said metering means by power lever position and as a function of engine speed, third means for controlling the area of said fuel metering means as a function of engine speed and an engine temperature and fourth means for controlling the area of said fuel metering means as a function of an engine pressure, means for the coordinate adjustment by said power lever of said propeller governor, the variable datum of said first means and said second means, means for maintaining a predetermined datum on said first means through a portion of the travel of said power lever, and means for limiting the effect of said power lever on said second means to only a portion of the travel of said power lever.

22. For a turbo-prop engine having a propeller, a propeller governor, a compressor and a power lever, fuel control apparatus including a source of fuel under pressure, conduit means through which fuel is delivered to said engine and fuel metering means in said conduit, first means including a variable datum for controlling the area of said fuel metering means inversely as a function of engine speed, second means for controlling the area of said metering means by power lever position and as a function of engine speed, third means for controlling the area of said fuel metering means as a function of engine speed and compressor inlet temperature and fourth means for controlling the area of said fuel metering means as a function of compressor discharge pressure, means for the coordinate adjustment by said power lever of said propeller governor, the variable datum of said first means and said second means, means for maintaining a predetermined datum on said first means through a portion of the travel of said power lever, and means for limiting the effect of said power lever on said second means to only a portion of the travel of said power lever.

23. For a turbo-prop engine having an adjustable pitch propeller and a propeller governor, fuel control apparatus including a source of fuel under pressure, conduit means through which fuel is delivered to said engine and fuel metering means in said conduit, first means for controlling the area of said fuel metering means inversely as a function of engine speed, a power lever coordinately connected to said propeller governor and said first means, said power lever having a first range of movement which adjusts said propeller governor to establish a fixed pitch for said propeller while adjusting said first means to control engine speed and a second range of movement which adjusts said propeller governor to vary the pitch of said propeller while establishing said first means in a fully opened position, second means for controlling the area of said fuel metering means as a function of engine speed and the position of said power lever, and third means for controlling the area of said fuel metering means as a function of engine speed, an engine temperature and an engine pressure.

References Cited in the file of this patent
UNITED STATES PATENTS 2,786,331    Williams _____ Mar. 26, 1957